United States Patent [19]

Choinski et al.

[11] Patent Number: 4,508,018

[45] Date of Patent: Apr. 2, 1985

[54] BOOT ASSEMBLY FOR BRAKE ACTUATOR

[75] Inventors: Graydon J. Choinski, Utica; Dave W. Brooks, Royal Oak, both of Mich.

[73] Assignee: Thyssen-Bornemisza, Inc., New York, N.Y.

[21] Appl. No.: 512,344

[22] Filed: Jul. 11, 1983

[51] Int. Cl.³ .............................................. F16J 15/18
[52] U.S. Cl. ......................................... 92/128; 92/63; 92/168; 74/18.2; 403/51; 29/517
[58] Field of Search ............... 92/63, 168, 128, 130 A; 403/134, 50, 51; 74/18.2; 29/432.1, 517

[56] References Cited

U.S. PATENT DOCUMENTS

| | | | |
|---|---|---|---|
| 2,102,797 | 12/1937 | Helmer | 92/168 |
| 2,142,190 | 1/1939 | Hewitt | 92/168 |
| 2,290,776 | 7/1942 | Stillwagon, Jr. | 403/50 |
| 3,490,343 | 1/1970 | Afanador et al. | 92/168 |
| 3,511,061 | 5/1970 | Burckhardt | 403/50 |
| 3,943,831 | 3/1976 | Coupland | 92/63 |

FOREIGN PATENT DOCUMENTS 2644110  4/1978  Fed. Rep. of Germany ........ 92/168

Primary Examiner—Paul E. Maslousky
Attorney, Agent, or Firm—Krass & Young

[57] ABSTRACT

A method and apparatus are disclosed for assembling a protective boot in an air brake actuator. A mounting tube extends into the nonpressurized air chamber of the actuator and is formed with a groove in an outer peripheral surface. The end of the boot serves as a sleeve which is slipped over the end of the tube. A retainer ring, preferably carried by the boot, is forced downwardly to compress portions of the boot into the tube groove to thereby secure the boot in place.

9 Claims, 5 Drawing Figures

BOOT ASSEMBLY FOR BRAKE ACTUATOR

TECHNICAL FIELD

This invention relates to actuators operating under fluid pressure and, more particularly, to air brake actuators for vehicles.

BACKGROUND ART

Actuators for use in fluid operated braking systems are well known in the art. Such braking systems typically include a service brake air chamber which is connected by way of a mounting tube to the plunger housing of a wedge foundation brake. The air chamber is divided by way of a diaphragm into a pressurized section and a nonpressurized section. Application of fluid pressure, generally air, to the pressurized section flexes the diaphragm causing longitudinal movement of a push rod in the mounting tube. The other end of the push rod is connected to mechanisms for applying braking force, for example, to the wedge assembly of a wedge foundation brake.

The nonpressurized section is normally vented to the atmosphere. Unfortunately, the vents provide passageways for the introduction of road dirt, salt, water or other debris which may adversely affect the operation of the working parts. To prevent this from occurring it has been commonplace to use a boot to close off the end of the tube and seal the parts from these adverse conditions.

Various methods have been employed in the past to mount the boot in the service air chamber. One common technique is to use adhesive to glue the end of the boot to the mounting tube. Among the disadvantages of this approach is that it is a fairly labor intensive operation during assembly and that, once assembled, it is difficult to replace under field service conditions. Other approaches include the provision of retainers or the like attached to the bottom of the air chamber housing for holding the boot in place as illustrated in the promotional literature for Rockwell's "Stop Master" II brakes. Still other techniques include the formation of clips in the lower annular bead of the boot which are adapted to engage the mounting tube. However, none of these approaches have been entirely satisfactory.

DISCLOSURE OF THE INVENTION

Pursuant to the present invention the mounting tube extends a given distance into the service brake air chamber and is provided with a groove in its outer peripheral surface. One end of the boot serves as a neck or sleeve which is fitted over the end of the tube. An annular retaining ring surrounding the boot sleeve portion in the area of the groove is adapted to compress portions of the boot into the groove to thereby sercurely lock the boot in place.

Preferably, the annular retaining ring includes a radially outwardly extending flange. If it becomes necessary to remove the boot assembly for replacement and the like, a tool such as a screwdriver may be used to contact the flange and pry the retainer ring from the tube. In such manner, the boot assembly is easily field servicable.

In the preferred embodiment, the boot includes a collar of smaller diamter than the sleeve end portion of the boot. During assembly the retaining ring is carried by the collar. The sleeve end of the boot is slipped over the end of the mounting tube and the retaining ring is forced from the collar over the tube to compress the boot material against the tube to hold the boot in place. Preferably, the ring includes projections on its inner surface that bite into the boot material to prevent slippage of the ring.

BRIEF DESCRIPTION OF THE DRAWINGS

The various advantages of the present invention will become apparent to those skilled in the art after reading the following specification and by reference to the drawings in which.

DESCRIPTION OF THE PREFERRED EMBODIMENT

Figure 1:
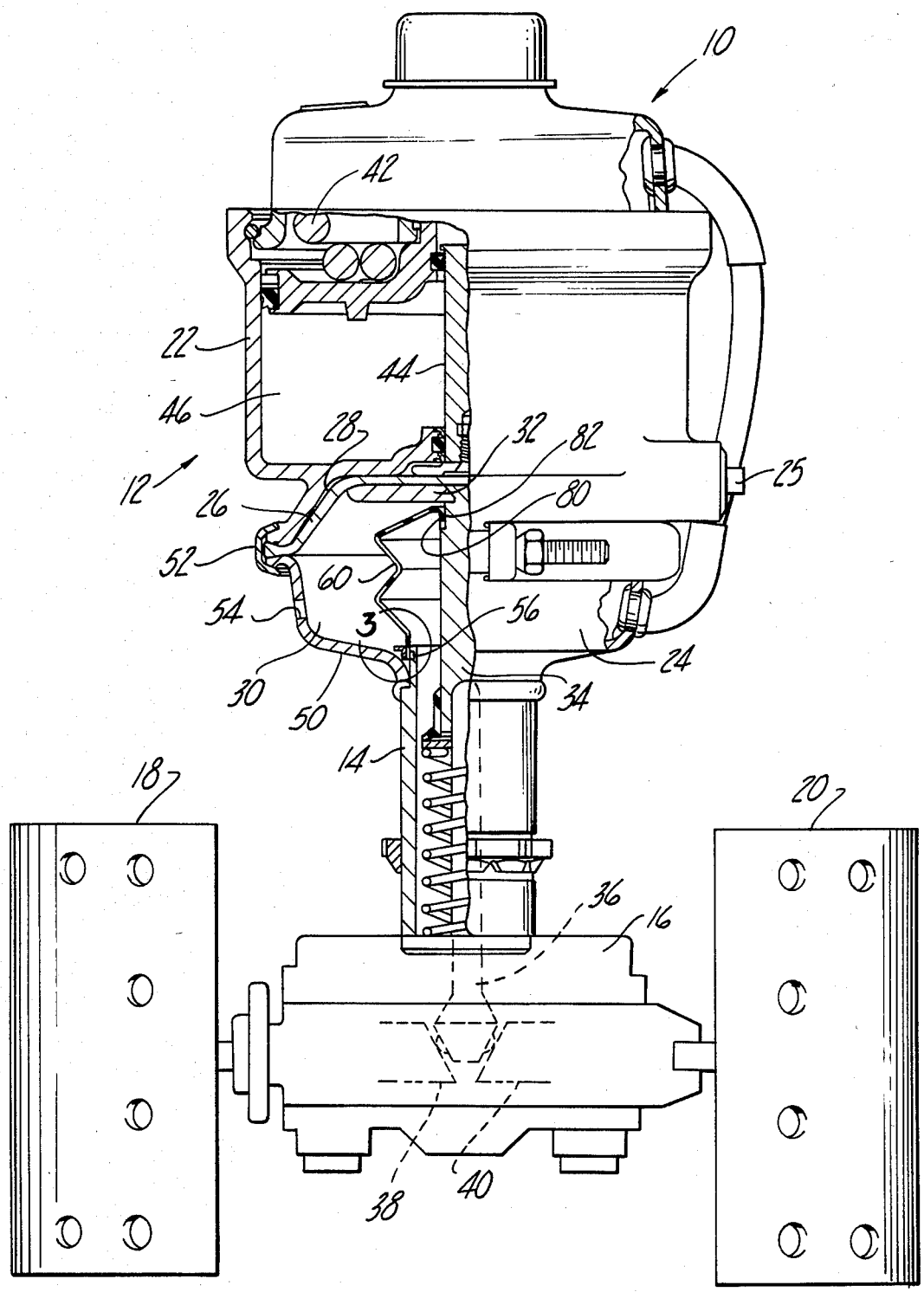
FIG. 1 is a fragmentary view of a braking system incorporating the teachings of the present invention.

FIG. 1 illustrates a braking system 10 incorporating the features of this invention. In general, system 10 incorporates an actuator 12 connected by way of a mounting tube 14 to the plunger housing 16 of a wedge foundation brake. Plunger housing 16 is connected to brake shoes 18 and 20. Actuator 12, as illustrated in FIG. 1, is known as a tandem actuator in that it includes a parking section 22 as well as a service brake section 24. However, it should be realized that the present invention may be used in braking systems employing only the service brake section 24 of the actuator.

Brake systems of this general configuration are well known in the art and need not be described in detail herein. Briefly, when the driver applies the brake pedal, compressed air is introduced into the service brake section 24 via inlet 25. A diaphragm 26 divides service section 24 into a pressurized chamber 28 and a nonpressurized chamber 30. The applied air pressure causes diaphragm 26 to flex pushing a piston assembly consisting of plate 32 and rod 34 downwardly as viewed in FIG. 1. The opposite end of rod 34 is connected to a wedge assembly generally designated by the numeral 36. The wedge assembly forces apart two plungers diagramatically illustrated in FIG. 1 and bearing the reference numerals 38 and 40. The outward movement of plungers 38 and 40 forces the brakes shoes 18 and 20, respectively, against the brake drum (not shown).

Alternatively, when the parking brake is set or in the event of air pressure loss, parking section 22 creates the same action by way of a power spring 42 urging push rod 44 downwardly due to the loss of pressure within chamber 46.

Special attention should now be drawn to the service brake section 24. The housing of the service brake section 24 is defined by a dish shaped member 50 having a radially extending lip which is clamped to diaphragm 26 by way of clamp ring 52. Member 50 includes one or more vents 54 so as to maintain chamber 30 in a nonpressurized state. The opposite end of member 50 defines a throat which is joined to mounting tube 14 as by welding or the like. As can be seen most clearly in FIG. 3, the end of the mounting tube 14 projects a short distance into the service brake housing, more particularly, into nonpressurized chamber 30. The outer peripheral surface of the end of tube 14 includes a groove 56 formed therein.

Figure 2:
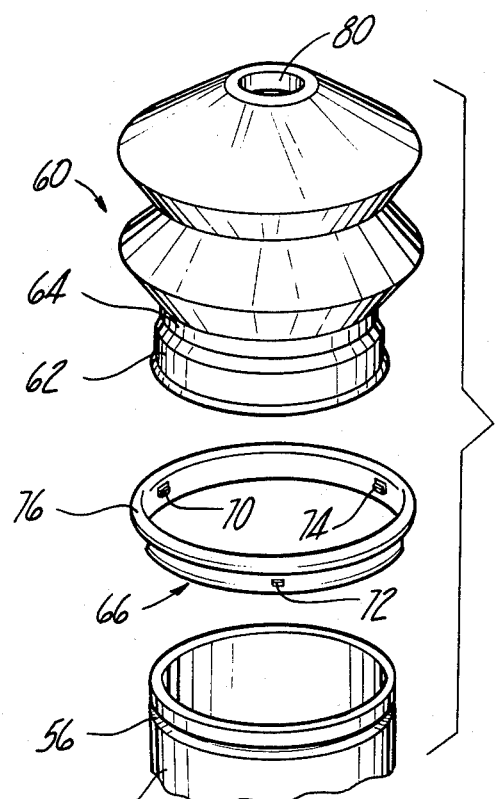
FIG. 2 is an exploded perspective view of the boot assembly of the preferred embodiment of this invention.

Boot 60 generally takes the form of a bellows-type diaphragm made of flexible material. In the preferred embodiment, boot 60 is made of neoprene rubber. As can be seen perhaps most clearly in FIG. 2, one end of boot 60 includes an annular sleeve portion 62 whose inner diameter is slightly larger than the outer diameter of the end of tube 14. Displaced inwardly from sleeve portion 62 is an annular area of reduced diameter defining a collar portion 64. As will appear later herein, the purpose of collar 64 is to carry retainer ring 66 prior to final assembly.

Retainer ring 66 is made of any suitable rigid material such as steel. The inner diameter of retainer ring 66 is larger than the outer diameter of tube end 14 but smaller than the outer diamter of boot sleeve portion 62. As shown particularly well in FIG. 3, ring 66 surrounds boot sleeve portion 62 in the area of tube groove 56. Ring 66 thus serves to extrude or compress the boot material into groove 56 to thereby lock the boot in place. Groove 56 defines an outer shoulder 68 extending transversely to the longitudinal axis of tube 14. The boot material compressed by ring 66 forms a rib which engages shoulder 68 to prevent axial displacement of the boot as it moves in an accordian-like fashion during operation of the brake.

Figure 3:
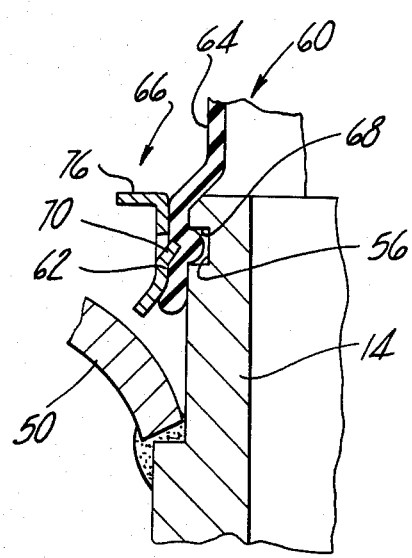
FIG. 3 is an enlarged view of the area defined by the circle labeled 3 in FIG. 1.

Preferably, the inner peripheral surface of ring 66 includes a plurality of tangs 70, 74. The tangs 70-74 provide inwardly directed projections pointing towards the end of the tube which serve to bite into the boot material to prevent the retainer ring 66 from axially sliding off of the tube due to vibrations and the like. Although not critical to the operation of the invention, the tangs 70-74 may be located so that they are adjacent the groove shoulder 68 as shown in FIG. 3 to provide additional compression of the boot material into the groove 56.

According to a feature of this invention the ring 66 includes a radially outwardly extending flange portion 76. Flange portion 76 provides a lip which may be engaged by a tool such as a screwdriver of the like to pry the retainer ring 66 off of the tube 14. This procedure can be easily accomplished in the field without special tools. Accordingly, if it should become necessary to replace the boot 60 this can be accomplished with little effort.

Rounding out the boot assembly, the opposite end of the boot is provided with a down turned flange forming a neck 80 which is press fit about a relieved portion 82 formed in piston 34.

The boot assembly just described serves the purpose of sealing the working parts of the brake system 10 from adverse road conditions which otherwise may extend into the chamber 30 by way of the vents 54. The features of this invention cooperate to provide a rugged construction that has excellent sealing characteristics even under these adverse conditions. And, in the event that the boot ever needs to be replaced, this can be accomplished in an easy manner. The boot assembly construction also lends itself to facilitating assembly without the use of adhesives. One such method of assembling the boot onto the tube will be described in connected with the method aspects of the present invention which follows.

Figure 4:
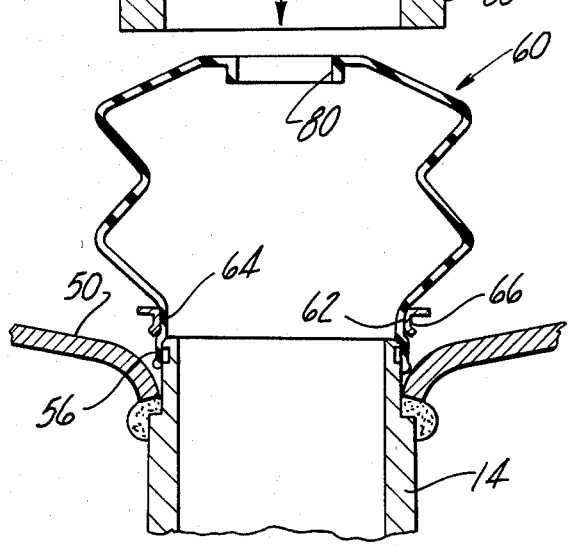
FIG. 4 is a cross-sectional view illustrating the arrangement of parts during one step of the assembly process according to the method of this invention.

Turning now to FIG. 4, retainer ring 66 is placed on the collar 64 of the boot so that it is carried thereby. The provision of collar 64 enables the manufacturer to preassemble these two parts together in a convenient manner so that the retainer ring does not become separated during shipment, storage or the like. The collar also serves to prelocate the retainer ring 66 in the appropriate position for final assembly.

The sleeve 66 of the boot 60 is then slipped over the end of the tube 14. The relative dimensions of the boot sleeve 66 and tube end 14 are such that the boot is loosely fitted around the tube with the axial end of the boot resting on member 50 near the joinder therewith to tube 14. It should be noted that at this stage of the operation that the housing member 50 is not yet clamped via clamping ring 52 to the remaining portions of the actuator. Consequently, this leaves room for a pressure tool 88 to obtain access to the boot assembly from above.

Figure 5:
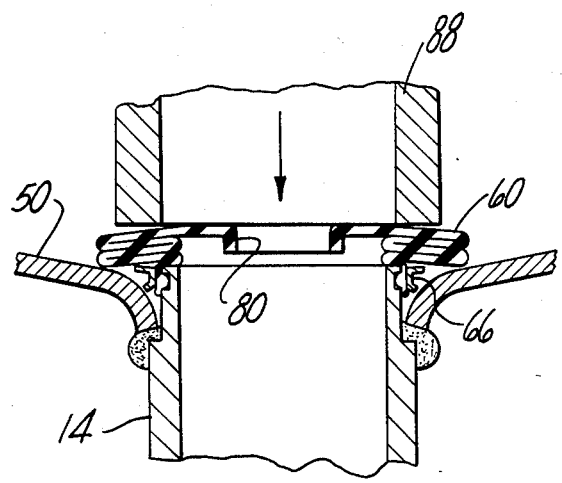
FIG. 5 is a view illustrating a subsequent assembly step.

Tool 88 may take a variety of forms to accomplish its intended purpose. In this embodiment, tool 88 includes an annular end dimensioned so as to generally overlay retainer ring 66. As can be seen in FIG. 5, tool 88 is driven downwardly through boot 60 to force the ring 66 from the boot collar 64 over the end of the tube 14 to compress the material of the boot sleeve portion 62 into the tube groove 56. The downwardly force on tool 88 can be provided by a variety of sources such as an automatic pneumatic press if used in an assembly line type operation or simply a hand arbor press or the like during field servicing. During the pressing operation the member 50 may be supported by a suitable fixture (not shown) and the sleeve portion exterior 62 of the boot may be pre-lubricated to aid the movement of the retainer ring 66 to its final position. In any event, those skilled in the art can appreciate that the boot assembly construction and method provide a reliable means of securing the boot even though thee is relatively little space to work with to make the boot connection in these types of actuators.

To connect the rod 34 to the boot 60, the rod 34 is lubricated and inserted downwardly through neck 80 until it engages relieved portion 82. Suitable means such as a support tube slid upwardly through tube 14 may be used to engage the upper inner wall of the boot to hold it reasonably taut during this assembly step.

Various modifications of the present invention will become apparent to the skilled practitioner after studying the specification, drawings and following claims.

We claim:

1. In a brake actuator having a service section chamber housing connected to a second housing by means of a mounting tube extending at one end thereof a short distance into said service section chamber housing and including a piston assembly extending through said mounting tube movable therein for cooperation with mechanisms in the second housing to generate braking forces, the improvement comprising:
   an annular groove formed in the outer peripheral surface of said one tube end within said chamber housing;
   a flexible boot connected at one end to said piston assembly and including a sleeve portion at the other end fitted telescopically over said one tube end and having an axial length greater than the axial length of said groove, said sleeve portion having a generally smooth cylindrical outer wall and a generally smooth cylindrical inner wall extending, with uniform diameter, from said other boot end throughout the axial length of said sleeve portion, the diameter of said inner wall in the relaxed condition of said boot being at least as great as the outer diameter of said one tube end so as to facilitate fitting said sleeve portion over said one tube end; and a rigid annular retainer ring surrounding said sleeve portion in the area of said annular groove having an axial length greater than the axial length of said groove and having an inner diameter less than the relaxed outer diameter of said sleeve portion but greater than the outer diameter of said one tibe end, said ring and said sleeve portion of said boot axially overlapping said groove entirely including both axial ends of said groove in the assembled relation of said ring, said boot and said one tube end so that said ring compressingly extrudes a portion of the inner wall of said sleeve portion into said annular groove to form an extruded inner bead axially filling said groove to preclude axial movement of said boot relative to said groove and thereby secure said boot to said one tube end.

2. The improvement of claim 1 wherein the boot further includes an annular collar portion between said sleeve portion and said one boot end having a smaller outer diameter than that of said sleeve portion; and a further annular portion between said collar portion and said one boot end having a larger outer diameter than that of said collar portion, whereby said retainer ring may be positioned on and carried by said collar portion prior to final assembly.

3. The improvement of claim 1 wherein said retainer ring includes means projecting from an inner surface thereof for engaging the boot and preventing axial displacement of the ring relative to the tube.

4. The improvement of claim 3 wherein said means includes a plurality of tangs angled in a direction pointing toward the open tube end.

5. The improvement of claim 4 wherein said tangs are positioned adjacent said groove in the tube end.

6. The improvement of claim 1 whereifn portions of the piston assembly include a relieved area therein, with said one end of the boot being formed with a down turned annular neck pressing against the relieved area in the piston.

7. A method of assembling a boot to an end of a mounting tube in a brake actuator, said method comprising:

forming an external annular groove in said tube end;
placing a retainer ring having a greater axial length than that of said groove on a collar formed in an outer surface of said boot, said boot having a annular sleeve portion adjacent said collar of larger outer diameter than that of said collar and of greater axial length than that of said groove;
fitting said sleeve portion of said boot over said tube end in axially overlapping relation to said groove while carrying said ring on said collar of said boot; and forcing said ring from said collar over said sleeve portion of said boot to a position axially overlapping said groove entirely including both axial ends of said groove in an assembled condition to compressingly extrude portions of said sleeve portion into said annular groove to form an extruded inner bead axially filling said groove to preclude axial movement of said boot relative to said groove and thereby secure said boot to said tube end.

8. In a brake actator having a service section chamber housing connected to a second housing by means of a mounting tube extending at one end thereof a short distance into said service section chamber housing and inluding a piston assembly extending through said mounting tube movable therein for cooperation with mechanisms in the second housing to generate braking forces, the improvement comprising:

an annular groove formed in the outer peripheral surface of said one tube end within said chamber housing;

a flexible boot connected at one end to said piston assembly and inlcuding a sleeve portion at the other end fitted telescopically over said one tube end, said sleeve portion having a generally smooth cylindrical outer wall and a generally smooth cylindrical inner wall having a relaxed diameter at least as great as the outer diameter of said one tube end so as to facilitate fitting said sleeve portion over said one tube end; and a rigid annular retainer ring surrounding said sleeve portion in the area of said annular groove and having an inner diameter less than the relaxed outer diameter of said sleeve portion but greater than the outer diameter of said one tube end so that said ring compressingly extrudes a portion of the inner wall of said sleeve portion into said annular groove to secure said boot to said one tube end, said ring including a radially outwardly extending flange portion to permit removal of said boot from said one tube end by a prying force applied to said flange portion of said ring.

9. A method of assembling a boot to an end of a mounting tube in a brake actuator, said method comprising:

forming an external annular groove in said tube end;
placing a retainer ring on a collar formed in an outer surface of said boot, said boot having an annular sleeve portion adjacent said collar of larger outer diameter than that of said collar;
fitting said sleeve portion of said boot over said tube end while carrying said ring on said collar of said boot; and
forcing said ring from said collar over said sleeve portion of said boot, by a tool pressing through said boot from an opposite end thereof against a flanged surface of said retaining ring, to compressingly extrude portions of said sleeve portion into said annular groove and thereby secure said boot to said tube end.

* * * * *